M. H. McNAIR.
DEVICES FOR FITTING AND POLISHING CYLINDERS AND RINGS
No. 189,483. Patented April 10, 1877.
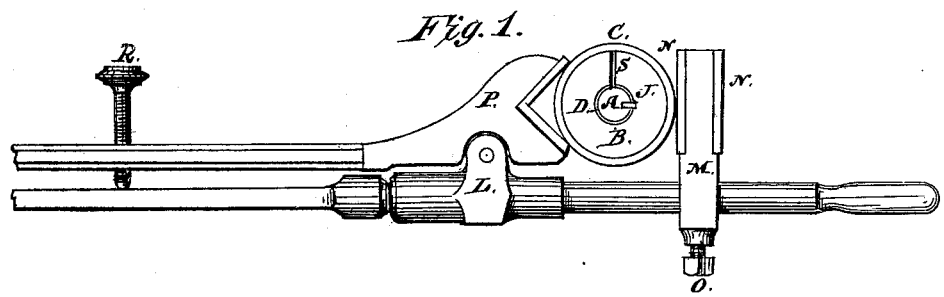
Fig. 1.
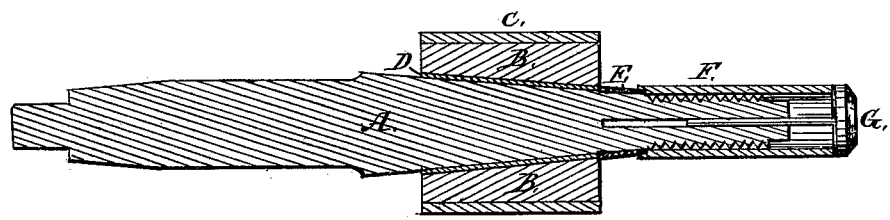
Fig. 2.
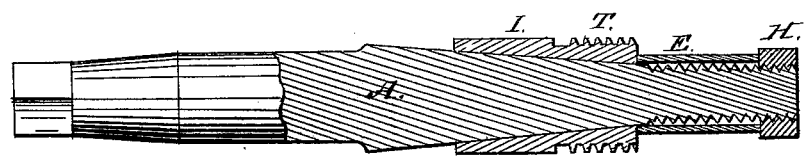
Fig. 3.
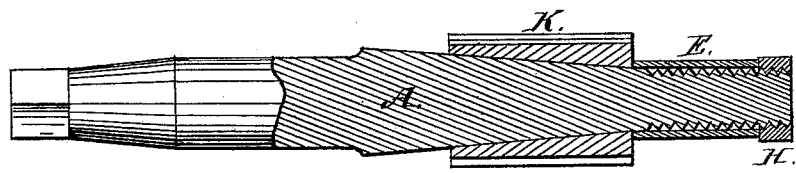
Fig. 4.
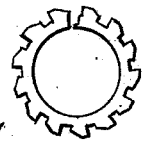 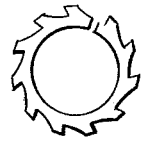
Fig. 5. Fig. 6.
Witnesses: Inventor
Milton H. McNair

UNITED STATES PATENT OFFICE.

MILTON H. McNAIR, OF MEADVILLE, PENNSYLVANIA.

IMPROVEMENT IN DEVICES FOR FITTING AND POLISHING CYLINDERS AND RINGS.

Specification forming part of Letters Patent No. 189,483, dated April 10, 1877; application filed October 12, 1876.

*To all whom it may concern:*

Be it known that I, MILTON H. MCNAIR, of the city of Meadville, in the county of Crawford and State of Pennsylvania, have invented an Improved Mandrel and Clamp, the object being, first, to fix objects firmly to the mandrel to be cut, dressed, or polished on their outer surfaces; and, second, to cut, dress, or polish the inner surfaces of rings, cylinders, working-barrels of pumps, &c., on the same mandrel—in other words, to grind and polish both the inside and outside of a cylinder without removing it from the lathe.

Figure 1 is a side view of the clamp, with a ring, C, in its grasp. Inside the ring C is a thick cylinder, B, of lead, guttered on its outer surface, to hold emery. It is slotted from end to end, as at S. Next to the mandrel A is a steel cylinder, D, to which the lead is soldered. The feather J prevents turning on the mandrel. The standard M is held to the slide L at any point by the set-screw O. The jaw is tightened or relaxed by the thumb-screw R, and both the faces of the jaws P and the standard M are faced with copper or other soft metal, leather, or wood.

Fig. 2 is a longitudinal section of a tapered mandrel, A. The same letters show the same parts as in Fig. 1. There is a slotted ferrule, E, that fits the small end of the mandrel, and pushes against the steel ring D, and there is another ferrule, F, that overlaps E, and is shouldered against it; and then the button G fits against the outer end of F, and is kept centrally in place by a long shank sliding in a central hole in the mandrel. The button G is tapped with a hammer while the lathe is in motion, to take up the wear of the grinders or polishers.

Fig. 3 is the same mandrel with a slotted pipe, I, and a thread cut at one end. This is to dress nuts at both their sides without removing them from the mandrel. The nut is turned on the thread T. The nut H is then made to drive the ferrule E against I, till it is firmly expanded into the nut that is to be dressed.

Figs. 4 and 6 show the side and end of a rimmer, K, that is made to take up the wear of the cut by the nut H, while the sides always remain parallel, and thus finish a true hole.

Fig. 5 is the end view of a tap, that is operated the same as Fig. 6, the object being to finish a female thread of the exact size without any taper.

Operation of Fig. 1: First, the clamp grasps the ring firmly by the action of the screw R against L. The lead cylinder then revolves inside C, the desired tension being given from time to time as the lathe revolves by tapping the button G. Then, when the inner surface is finished, the screw R is relaxed, and a smart rap on the button fixes the ring to the cylinder, and makes it to revolve between the plates N N till the outer surface is finished. The cylinder D may be made of any soft metal, wood, or other yielding material.

I claim—

1. The combination of the tapered mandrel A, expansible cylinder and cylinder-lining B D, ferrules E and F, and button G, substantially as and for the purpose specified.

2. The combination of the tapered mandrel A, expansible cylinder B, and the griping and holding device, substantially as described, and for the purpose set forth.

MILTON H. McNAIR.

Witnesses:
THOS. MINNISS,
J. N. McCLOSKEY.